United States Patent [19]

Del Campo

[11] Patent Number: 5,059,054
[45] Date of Patent: Oct. 22, 1991

[54] PROCESS FOR BONDING TUBING WITH POLYTETRAFLUOROETHYLENE GLASS REINFORCED TAPE

[75] Inventor: Daniel A. Del Campo, Thousand Oaks, Calif.

[73] Assignee: National Starch and Chemical Investment Holding Corporation, Wilmington, Del.

[21] Appl. No.: 366,833

[22] Filed: Jun. 15, 1989

[51] Int. Cl.⁵ .................. B29C 65/48; B62K 19/22
[52] U.S. Cl. ................................ 403/13; 156/289; 156/294; 280/281.1; 403/268; 403/361
[58] Field of Search .............. 156/158, 289, 293, 294, 156/303.1, 307.3, 295; 29/525, 464; 264/249; 403/203, 292, 365, 372, 12, 13, 14, 265, 266, 267, 268, 361; 285/915; 280/281.1

[56] References Cited

U.S. PATENT DOCUMENTS

| 3,030,124 | 4/1962 | Holloway | 280/281.1 |
|---|---|---|---|
| 3,126,306 | 3/1964 | Sherman | 156/392 |
| 3,355,226 | 11/1967 | Portz | 403/268 |
| 3,834,965 | 9/1974 | Seiwert et al. | 156/295 |
| 3,917,421 | 11/1975 | Carmien et al. | 403/12 |
| 3,937,641 | 2/1976 | Kushner et al. | 156/294 |
| 4,047,731 | 9/1977 | Van Auken | 280/281.1 |
| 4,063,980 | 12/1977 | Trunnell | 156/294 |
| 4,103,875 | 8/1978 | Glass | 403/361 |
| 4,405,252 | 9/1983 | Easterling | 403/11 |
| 4,479,662 | 10/1984 | Defour et al. | 280/281.1 |
| 4,583,755 | 4/1986 | Diekman et al. | 403/13 |
| 4,700,033 | 10/1987 | Clark | 403/361 |
| 4,900,049 | 2/1990 | Tseng | 403/265 |

FOREIGN PATENT DOCUMENTS 1296443 3/1987 U.S.S.R. ................. 156/293

*Primary Examiner*—Michael W. Ball
*Assistant Examiner*—Steven D. Maki
*Attorney, Agent, or Firm*—Edwin M. Szala; Royal N. Ronning, Jr.

[57] ABSTRACT

This invention presents an improved process for the bonding of tubing which permits the tubing members to be maintained in the appropriate alignment during the curing of the bonding adhesive. Specifically, the process involves the slip-fitting of a male member into a female member coated on the interior with the curable adhesives the improvement being the placing of a piece of PTFE/glass reinforced tape over the end of the male member prior to its insertion into the female member, such that, after insertion, the members are maintained in appropriate alignment.

16 Claims, 1 Drawing Sheet

PROCESS FOR BONDING TUBING WITH POLYTETRAFLUOROETHYLENE GLASS REINFORCED TAPE

FIELD OF INVENTION

This invention relates to a process for non-compression or slip-fit bonding of tubing to a non-compression connection. The process involves the use of a positioning means which maintains both tubing components in the appropriate alignment to permit the curing of the adhesive which forms the bond. Such a process can be used in a variety of applications including the production of bicycle frames.

BACKGROUND OF INVENTION

In the bonding of tubing to connections, structural grade epoxy adhesives are often used. A major problem with such a system, however, is that both elements which are to be bonded must be maintained in the appropriate alignment for a time of sufficient duration, to permit the adhesive to cure. Any deviation in this alignment will, of course, result in members which are bonded in an inappropriate alignment, therby rendering the bonded product less than satisfactory or useless. This is particularly important in applications such a bicycle frames, where the two members must be bonded in alignments subject to strict tolerances.

To remedy this, practitioners have often utilized a compression fit, wherein both members are tapered to insure a good fit. However such a process suffers from the distinct drawbacks of being extremely susceptible to expansion and/or contraction of both members, as well as the general complexity encountered in forming the compression fit assembly. Ordinarily these assemblies must be formed by hand, preventing the use of an automated process for assembly.

Thus, there exists a real need for devising a process for the bonding of tubing which will hold the tubing in the appropriate alignment for a sufficient time to permit the adhesive to cure, yet in which the connection is adhesively formed and can be adapted to an automated assembly process.

SUMMARY OF INVENTION

Accordingly, this invention presents a process for the bonding of tubing which permits the members to be maintained in the appropriate alignment during curing. Further, this invention to presents a process which is easily performed and will permit adaptation to an automated process.

Briefly, the process involves the joining of two tubing members; a female member (which is either a solid rod with a hollow end or a hollow tube) and a male member (which may be solid rod or hollow tube). The external diameter of the male member is slightly less than the internal diameter at least that portion of the female member in which the bond is to be formed, such that it can be inserted and rotate freely, yet not exhibit a high amount of lateral movement.

In the process, polytetrafluoroethylene (PTFE), such as that marketed by E. I. Du Pont de Nemours and Company under the trademark Teflon® glass reinforced tape is applied to the end of the male member which is to be bonded. The tape is applied directly across the end of the male member, and extends along the sides of the member a distance which preferably coincides with the length of the bond to be formed. This member is subsequently slip-fit into the female member, the interior of which was previously coated with adhesive and the adhesive is cured. The applied tape acts to maintain the members in the proper alignment during the cure.

DETAILED DESCRIPTION OF INVENTION

Figure 1A:
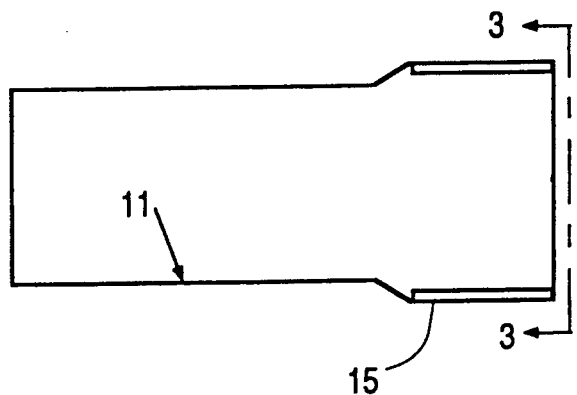
FIG. 1A and FIG. 1B are is a longitudinal diagram of the tubing members which are to be bonded.
Figure 1B:
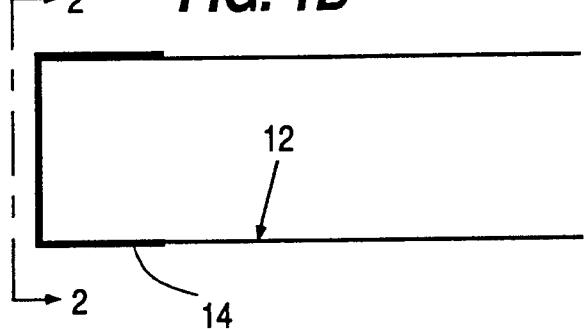
Figure 2:
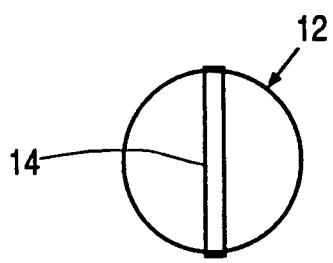
FIG. 2 is a view of the male member taken along lines 2—2 of FIG 1B.

The process of the instant invention utilizes a slip fit joint to bond a male member to female member. Referring to FIG. 1, the female member as shown in FIG. 1A (11) is a hollow tube. This member may contain an enlarged end (15) to receive the male member (12) as shown in FIG. 1B, or it may be a straight tube. The male member (12) has a diameter slightly smaller than the end of the female member in which the bond is to be made.

Figure 3:
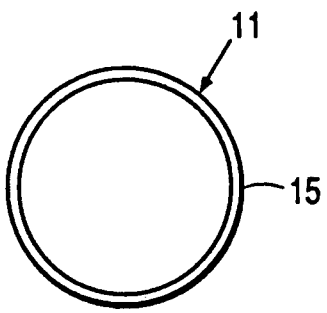
FIG. 3 is a view of the female member taken along lines 3—3 of FIG. 1A.

In the process, substantially the entire interior circumference of the female member as shown in FIG. 3, is coated with the bonding adhesive to the desired length, bearing in mind that this length will preferably coincide with the length of the male member (12) which will be bonded within the female member (11). At some time prior to, during, or subsequent to this adhesive coating, a piece of PTFE glass reinforced tape (14) is looped over the end of the male member, extending down the sides to a length approximately equivalent to the length of the adhesive in the female member (11). The male member is then slip fit in the female member to the desired length and the adhesive is cured. The tape (14) serves to maintain the members in the proper alignment during this curing process, and becomes an integral part of the ultimate bond.

The tubing members can be contructed of any suitable material, but are preferably metal, more preferably aluminum (Al), molybdenum(Mb), chromium(Cr), magnesium(Mg), or alloys containing these metals. Synthetic materials, such as plastics, and any other materials can also be used, the primary criterion being their ability to withstand heating to the temperatures needed for curing of the adhesive. Further, while cylindrical members are illustrated in FIGS. 1A, 1B, 2 and 3, it is anticipated that members of any shape, e.g. rectangular or octagonal, can be utilized, so long as they are capable of being slip fit together.

In order to form this fit, the female member must have a diameter slightly larger than that of the male member. Ideally, this diameter is 0.005" to 0.020", preferably 0.005" to 0.010", larger than that of the male member; significantly smaller differences tend to make the fit hard to achieve, while significantly larger differences will not permit the tape to hold the members in the proper alignment, unless the tape is quite thick. As shown in FIG. 1A, this larger diameter may be achieved by the use of an enlarged fitting, such as a flanged fitting. Alternatively, the entire female member may have this larger diameter.

The adhesive utilized to form the bond is an adhesive capable of forming a bond of the desired strength, preferably a heat cured epoxy such as those of the ESP series, manufactured and sold by Permabond International, especially ESP® 110. Such adhesives form strong bonds and cure at 100°-150° F. The only other requirements of the adhesive are that it be compatible with the members and the tape. Thus, it is to be understood that wide variety of adhesives can be used in the method of this invention.

The tape utilized in the methods of this invention is a PTFE/glass reinforced tape which is capable of withstanding prolonged heating at the adhesive cure temperature (as the curing time can often exceed 1-2 hours) without deforming or cracking. The tape must also have a thickness about 0.002"-0.004" greater than the difference between the diameters of the male and female members to insure that it will maintain the members in proper alignment. The width of the tape can be any convenient width, but preferably is 5-10% of the diameter of the male member.

The process of this invention can be utilized in a number of applications including the production of bicycle frames. It has a particular utility in the bonding of carbon/Kevlar® wrapped aluminum tubes to chromolly (an alloy of chromium and molybdenum) lugs to form strong, lightweight bicycle frames Kevlar is an aromatic polyamide.

It is apparent that many modification and variations of this invention as hereinabove set forth may be made without departing from the spirit and scope thereof. The specific embodiments described are given by way of example only and the invention is limited only by the terms of the appended claims.

What is claimed is:

1. In a process for adhesively bonding a male tubular member to a hollow tubular female member which comprises slip-fitting said male member into said female member, wherein a portion of the interior of said female member is coated with a curable adhesive capable of forming a bond, and subsequently heating the resultant assembly to cure the adhesive, the improvement comprising placing a piece of polytetrafluoroethylene glass reinforced tape over one end of said male member prior to the slip fitting, which tape extends along sides of said male member, and subsequently slip-fitting said end into said female member such that members are maintained in a desired alignment during the heating to cure the adhesive and forming a bond between the two members.

2. The process of claim 1, wherein the male member posesses a diameter 0.005"-0.020" smaller than the diameter of the female member.

3. The process of claim 1, wherein the female member possesses an enlarged flanged fitting and having an internal diameter 0.005"-0.020" larger than that of the male member.

4. The process of claim 1, wherein the adhesive is a heat cured epoxy.

5. The process of claim 1, wherein the width of the tape is 5-10% of the diameter of the male member.

6. The process of claim 1, wherein the male member is a solid rod.

7. The process of claim 1, wherein the male member is a hollow tube.

8. The process of claim 1, wherein the female member is a hollow tube.

9. The process of claim 1, wherein the female member is a solid rod with a hollow end.

10. The process of claim 1, wherein the male and female members are metal.

11. The process of claim 10, wherein the metal is selected from the group consisting of aluminum, molybdenum, magnesium, chromium, and alloys containing these metals.

12. The process of claim 1, wherein the male and female members are plastic.

13. A bicycle frame including said male tubular member and said hollow tubular female member adhesively bonded by the process of claim 1.

14. The bicycle frame of claim 14, wherein the female member is an aluminum tube wrapped with material comprising carbon/aromatic polyimide and the male member is a metal lug wherein the metal is selected from the group consisting of aluminum, molybdenum, magnesium and chromium and alloys containing these metals.

15. A tubing assembly comprising a hollow tubular female member having a portion of its interior surface coated with a heat curable adhesive and an end of a tubular male member inserted into said female member, said male member being bonded to said female member with said adhesive and having polytetrafluoroethylene glass reinforced tape placed over the end inserted into said female member and along sides of the male member such that the tape is situated between said male member and said curable adhesive.

16. The tubing assembly of claim 15 wherein the width of said tape is 5-10% of the diameter of the male member.

* * * * *